(12) United States Patent
Meisser et al.

(10) Patent No.: US 8,191,599 B2
(45) Date of Patent: Jun. 5, 2012

(54) APPARATUS FOR LAMINATING A SOLAR MODULE

(75) Inventors: Claudio Meisser, Cham (CH); Roger Doudin, Obernau (CH); Markus Bucher, Buchrain (CH)

(73) Assignee: komax Holding AG, Dierikon (CH)

( * ) Notice: Subject to any disclaimer, the term of this patent is extended or adjusted under 35 U.S.C. 154(b) by 0 days.

(21) Appl. No.: 12/589,385

(22) Filed: Oct. 22, 2009

(65) Prior Publication Data
US 2010/0126672 A1   May 27, 2010

(30) Foreign Application Priority Data

Nov. 21, 2008  (EP) .................................. 08405284

(51) Int. Cl.
*B32B 37/00* (2006.01)
(52) U.S. Cl. ..................... 156/583.1; 156/382
(58) Field of Classification Search .................. 156/228, 156/285, 381, 382, 580, 581, 583.1, 583.3; 100/325, 326
See application file for complete search history.

(56) References Cited

U.S. PATENT DOCUMENTS

| | | | |
|---|---|---|---|
| 5,108,532 | A | 4/1992 | Thein et al. |
| 6,250,217 | B1 * | 6/2001 | Korybutiak ................... 100/326 |
| 6,481,482 | B1 | 11/2002 | Shimotomai |
| 2003/0034110 | A1 | 2/2003 | Hubel et al. |
| 2004/0177917 | A1 | 9/2004 | Adachi |
| 2008/0115893 | A1 * | 5/2008 | Chikaki ........................ 156/499 |

FOREIGN PATENT DOCUMENTS

| | | |
|---|---|---|
| DE | 41 12 607 | 10/1992 |
| DE | 42 22 262 | 3/1993 |
| DE | 10 2004 033 540 | 1/2006 |
| EP | 0 339 275 | 11/1989 |
| EP | 1 550 548 | 7/2005 |
| EP | 1 923 921 | 5/2008 |
| JP | 62-083130 | 4/1987 |
| JP | 2008-147255 | 6/2008 |
| WO | WO 98/38033 | 9/1998 |

OTHER PUBLICATIONS

Partial European Search Report dated Apr. 1, 2010 with English translation of the relevant parts.
Publication of European Search Report (EP 2 189 284 A3) dated Aug. 23, 2010.

* cited by examiner

*Primary Examiner* — James Sells
(74) *Attorney, Agent, or Firm* — Collard & Roe, P.C.

(57) ABSTRACT

The apparatus for laminating a solar module includes a press for pressing and heating the solar module including: a first press part and a second press part between which an evacuable cavity is formed; a bearing surface for the solar module disposed in the cavity; a heater being disposed in the cavity and being movable relative to the bearing surface so that the solar module can be pressed via the heater against the bearing surface. The press includes one or more sealing bodies being disposed in an intermediate space between the heater and the first press part and/or in an intermediate space between the heater and the second press part and being brought into contact with the heater and at least one of the press parts so that the cavity is divided into at least two chambers being separated from one another in an airtight manner.

20 Claims, 8 Drawing Sheets

APPARATUS FOR LAMINATING A SOLAR MODULE

CROSS REFERENCE TO RELATED APPLICATIONS

Applicants claim priority under 35 U.S.C. §119 of European Application No. 08405284.4 filed on Nov. 21, 2008.

The invention relates to an apparatus for laminating a solar module according to the preamble of claim 1.

Flat solar modules have solar cells in their interior which must be protected from environmental influences. This protection consists in encapsulating the solar cells, for example, covering them with a film on both sides and with a glass plate on a front side. After assembling this multi-layer structure, the workpiece is laminated. For this purpose, the multi-layer workpiece is laminated in a laminating press, with the pressing of the module taking place in vacuum. The laminating process is staggered in time and the times at which the vacuum, the heat and the pressing force are to be applied should be adhered to as accurately as possible. During the laminating process, the film is fused onto the front and rear sides of the solar cells and following its solidification, forms a sealed inclusion of the solar cells.

The presses for laminating the solar modules consist at least of two parts, i.e. a press upper part and a press lower part. The mutually corresponding press parts (at least when they are brought into a suitable position relative to one another) form a cavity, hereinafter called pressing chamber, into which the respective solar module can be inserted. The pressing chamber can be evacuated in order to generate the required vacuum. In addition, a heating device is located in the pressing chamber for producing the required heat.

Thus, a laminating press is known from EP 1 550 548. The pressing chamber (cavity) of this laminating press is divided by a flexible membrane into a upper and lower part so that this type of press is also designated as "membrane press". During the laminating process, exclusively the lower part in which the solar module is located is evacuated. At the same time, the membrane is pulled in the direction of the lower pressing chamber as a result of the vacuum. This effect is additionally intensified by the fact that an excess pressure is generated in the upper part of the pressing chamber. The membrane in this case serves as an actual pressing means since it is brought into abutment with the solar module and presses the films uniformly towards one another and towards the solar module.

The outer edge of the membrane is firmly connected to the press upper part with the result that a large lower pressing chamber is formed. A heating element is disposed in this lower pressing chamber and the solar module is placed on said heating element for laminating. As a result of this arrangement, a fairly large lower pressing chamber must be evacuated. In addition, it is disadvantageous that the membrane usually consists of a material (e.g. rubber) which has a relatively low thermal conductivity. For this reason, only a relatively small heat flow can be supplied to the solar module via the side of the solar module opposite to the heating element (i.e. through the membrane). The membrane thus makes it difficult to regulate the supply and removal of heat so that the laminating process is lengthened in time.

In addition, the fastening of the membrane on the corresponding press part is complex. The membrane is clamped at its edges into the press part, where care needs to be taken to ensure that the membrane is in each case uniformly clamped along the edge so that no non-uniform stresses occur in the membrane. Only when the membrane acts uniformly on the solar modules, can the laminating process be successful, which is not ensured if the membrane is not correctly clamped.

Another press for laminating a workpiece is known from EP 0 339 275 A2. This press comprises a vacuum chamber in which the respective workpiece can be pressed between two plates placed in the vacuum chamber, each disposed horizontally and parallel to one another. One of the two plates serves as a bearing plate for the workpiece and is movable in the vertical direction relative to the other plate which is fixed in the vacuum chamber and disposed above the other of the two plates. Heat can be supplied to the workpiece via a heating device which is disposed on the upper of the two plates. The vacuum chamber can be evacuated as a whole via a line which opens into the vacuum chamber. The vacuum chamber has a relatively large volume so that it is relatively time-consuming to bring the air pressure prevailing in the vacuum chamber to the respectively desired values or to vary said air pressure within the desired framework during a laminating process.

It is therefore the object of the invention to further develop the aforesaid device for laminating solar modules and to provide a laminating press by which means solar modules can easily be laminated.

This object is achieved by an apparatus for laminating having the features of claim 1.

This apparatus for laminating a solar module is equipped with a press for pressing and heating the respective solar module (hereinafter also called "laminating press") which press comprises:

a) a first press part and a second press part which press parts are movable relative to one another and can be brought into a predetermined position in which a cavity is formed between the first and the second press part, which cavity can be evacuated, b) a bearing surface for the respective solar module disposed in the cavity, c) a heater which is disposed in the cavity and which is movable relative to the first press part and to the second press part and to the bearing surface in such a manner that the respective solar module can be pressed by means of the heater with respect to the bearing surface.

According to the invention, the press comprises one or more sealing bodies, wherein the respective sealing bodies are disposed in an intermediate space between the heater and the first press part and/or in an intermediate space between the heater and the second press part and are brought into contact or can be brought into contact with the heater and at least one of the press parts in such a manner that the cavity is divided by the heater and the respective sealing bodies into at least two chambers which are separated from one another in an airtight manner, wherein one of the chamber comprises the bearing surface.

Since one of the two chambers comprises the bearing surface for the respective solar module, the respective solar module is located in one of the two chambers and can be disposed between the heater and the bearing surface for carrying out a laminating process.

Since the cavity (hereinafter optionally also called "pressing space") is divided or can be divided by means of the respective sealing bodies into at least two chambers which are separated from one another in an airtight manner, this has the result that the variation of a gas pressure prevailing in the cavity can be simplified. When carrying out a laminating process, in certain phases of the process it is not necessary to vary the gas pressure uniformly in the entire cavity. For example, it can be sufficient to merely vary the gas pressure in one of the two chambers. Since each of the two chambers only comprises a fraction of the volume of the entire cavity, the gas pressure in one of the two chambers can naturally be varied more rapidly and usually with a lower energy consumption than when the gas pressure in the entire cavity needed to be varied to the same extent. This advantage is particularly significant when the respective solar module is to be exposed to a reduced gas pressure, for example, in a process step in which degassing of the solar module is to be carried out in a vacuum.

Moreover, the division of the cavity into two chambers which are separated from one another in an airtight manner makes it possible to produce a force acting on the heater if the gas pressures prevailing in the two chambers are different. By achieving a vacuum in that chamber in which the respective solar module is located compared to the air pressure prevailing in the other chamber, it can be achieved, for example, that the heater is pressed in the direction of the bearing surface in order to press the heater towards the solar module and thereby press the respective solar module. By controlling the gas pressures prevailing in each of the two chambers, it is accordingly possible to vary the position of the heater relative to the bearing surface or relative to the respective solar module rapidly and precisely by means of simple and cost-effective means.

Compared to a membrane press known from EP 1 550 548, the apparatus for laminating according to the invention furthermore has the advantage that the heater affords an efficient possibility for heating the respective solar module even from that side of the solar modules facing away from the bearing surface, especially as the heater can be brought into contact with the respective solar module during pressing and materials can be selected for constructing the respective heater (e.g. metal materials) which have a substantially higher thermal conductivity compared with those materials (e.g. rubber) suitable for fabricating a membrane of a conventional membrane press.

In one embodiment of the apparatus for laminating according to the invention, one of the chambers (hereinafter called "first chamber") is formed between the first press part, the respective sealing bodies and the heater and another one of the chambers (hereinafter called "second chamber") is formed between the second press part, the respective sealing bodies and the heater. The bearing surface for the respective solar module can, for example, be formed on the second press part. In this case, the second chamber serves to accommodate the solar module for the purpose of laminating.

In a further embodiment of the apparatus for laminating according to the invention, the respective sealing bodies are disposed in such a manner that they form a closed ring which runs around the respective solar module. In the event that the apparatus comprises a single sealing body, the sealing body can be configured as a one-piece ring. The latter simplifies the installation of the sealing body when mounting the apparatus or exchanging the sealing body, if this must be replaced.

The respective sealing bodies can be implemented in various ways within the scope of the invention.

The respective sealing body can, for example, be an elastically deformable body. Such a sealing body ensures that the two chambers are sealed with respect to one another even when, during pressing of the respective solar module, the heater is moved by a certain distance relative to the bearing surface or relative to the first press part or to the second press part. In one variant of the apparatus for laminating according to the invention, the respective sealing body is an elastically deformable body which is clamped between the heater and the first press part and/or between the heater and the second press part. This clamping of the respective sealing body can be achieved by a corresponding positioning of the heater relative to the first press part or to the second press part or to the bearing surface for the solar module. Since the sealing body is clamped between the heater and the first press part and/or between the heater and the second press part, the sealing body can achieve a sealing effect without the sealing body needing to be connected in a firmly bonded manner to the heater and the first press part and/or to the second press part. The latter simplifies the installation of the sealing body during mounting of the apparatus or exchange of the sealing body if this needs to be replaced.

The respective sealing body can be composed, for example, of various materials having different stiffness. The sealing body can, for example, have a core made of a material having a high stiffness (for example, of a metal) which is coated with a material having a (compared to the core) lower stiffness. In one realisation of the aforesaid variant, the sealing body can, for example, be formed on the basis of a frame made of sheet steel which has a layer of an elastic material (e.g. in the form of vulcanized rubber) on each of the opposite sides.

In one variant of the apparatus for laminating according to the invention, the respective sealing body comprises a flexible hose.

In a further development of this variant, the volume of the hose can be varied in such a manner that at a first predetermined volume the sealing body is not in contact with the heater and/or one of the press parts and at a second predetermined volume is in contact with the heater and with one of the press parts. If the volume of the hose is selected in such a manner that the sealing body is brought into contact with the heater and one of the press parts, the sealing body is then in a state in which it seals both chambers with respect to one another in a gastight manner. If, on the other hand, the volume of the hose is selected in such a manner that the sealing body is not brought into contact with the heater or one of the press parts, the sealing body is then in a state in which it does not seal both chambers with respect to one another in a gastight manner so that a through-connection for a gas (e.g. in the form of a gap) exists between the two chambers. By varying the volume of the hose, a connection between the two chambers can thus be opened or closed as desired. If the volume of the hose is selected so that the sealing body is not in contact with the heater, the heater can then be moved relative to the sealing body without the sealing body hindering this movement (for example, by friction between sealing body and heater).

This type of sealing body makes it possible, on the one hand, to vary the distance of the heater in relation to the bearing surface over a relatively large range (for this purpose, it is advantageous to select the volume of the hose such that the sealing body does not touch the heater); on the other hand, the volume of the hose can be selected in each case for various distances of the heater in relation to the bearing surface such that the sealing body is in each case brought into contact with the heater such that the two chambers are sealed with respect to one another in an airtight manner. An essential advantage of this type of sealing body can be seen in that the apparatus for laminating according to the invention, fitted with this type of sealing body, facilitates processing of various solar modules having different thickness: by varying the volume of the hose, a matching of the respective sealing elements corresponding to the respective thicknesses of the solar modules can be achieved without needing to exchange the respective sealing element.

In a further development of this variant, the sealing element comprises a hose which is inflatable, wherein the apparatus for laminating has means for varying a gas pressure prevailing in the hose. In this case, the volume of the hose can be varied by varying the gas pressure. In this case, the hose can be arranged so that on inflation of the hose, the sealing element expands in the direction of the heater in order to bring the sealing element into contact with the heater. In a preferred embodiment of this variant, the hose is designed in such a manner that on inflation, it expands substantially parallel to the bearing surface. In this case, the apparatus for laminating can be adapted particularly easily to solar modules of different thickness, particularly if the heater has a side surface which is aligned perpendicular to the bearing surface so that the sealing element can be brought into contact with this side surface by inflating the hose.

In the aforesaid embodiments, the volume of the respective hose can also be varied by supplying, instead of a gas, another pressure-transmitting medium, e.g. a liquid, to the interior of the hose or removing said medium from the interior of the hose. Instead of a flexible hose, another flexible hollow body, for example, a flexible bellows can also be used.

According to a further embodiment, the first press part comprises a cover which delimits the cavity and a sealing apparatus, the sealing apparatus comprising: a frame surrounding the respective solar module (also called "sealing frame") having a first contact surface for the cover and having a second contact surface for the second press part, a seal disposed on the first contact surface between the cover and the frame and a seal disposed on the second contact surface between the frame and the second press part.

The sealing apparatus offers the advantage that the sealing apparatus comprises all the elements which are required to seal the cover of the press against the second press part and therefore the cavity of the press against the external surroundings of the press.

The frame is configured to bear or receive the seals so that it is not necessary that the boundary surfaces of the cover of the first press part and the second press part opposite to the contact surfaces of the frame are correspondingly configured. In addition, it is easy to arrange the frame and in the event of a repair to the seal, the frame together with the seals can easily be exchanged.

It is furthermore advantageous that the sealing arrangement is articulated on at least one bolt which, from an outer side of the first press part, holds the frame on the side opposite the second press part. Accordingly, the sealing apparatus is mounted outside the press which facilitates the mounting and dismounting of the sealing apparatus. A ventilation hole which is guided outwards from at least one of the two chambers of the cavity can also be disposed in the frame. As a result, a separate ventilation or vent hole in the corresponding press part can be omitted, which is advantageous from the production technology point of view.

A seal, in particular a cord seal, is preferably disposed between the frame of the sealing apparatus and the cover of the first press part and the second press part. The cord seal is disposed in the frame longitudinally to an outer side of the press. The cord seal is formed from an, in particular, flexible material so that when the press is closed, when both press parts abut against one another, the cord seals are compressed and the contact surface of the respective cord seal to the cover of the first press part or to the second press part is enlarged. Since the frame is articulated from outside on the cover of the first press part, the sealing frame is disposed with play relative to the cover. Thus, as a result of the bringing together of the two press parts, the cord arrangements is also compressed between sealing frame and the first press part, thus increasing the contact area and therefore the seal.

According to a further development of the aforesaid sealing arrangement, the respective sealing body of the press is arranged in such a manner that the sealing body abuts in an airtight manner against the frame or is embedded in an airtight manner in a groove formed in the frame. Accordingly, the contact surface for the sealing body which must be formed on the first press part in order to be able to seal an intermediate space between the heater and the first press part with the sealing body, is formed on the frame of the sealing apparatus. There is therefore no need to form such a contact surface for the sealing body directly on the cover of the first press part. The latter simplifies the manufacture of the first press part.

Since the sealing body is preferably flexible or elastically deformable, the sealing body can simultaneously serve as a type of damper. During movement of the heater in the direction of the solar module, the heater is braked by the sealing body. The sealing body is disposed in such a manner between the heater and the frame of the sealing apparatus that the heater is positioned at a distance from the solar module when the first and second press part are in contact with one another and the sealing body is located in a relaxed state. In order that the heater can come in contact with the solar module, the heater must consequently be moved against the restoring force generated by the sealing body.

According to a further embodiment of the apparatus according to the invention, the heater is movably fastened to one of the press parts, the apparatus comprising means for moving the heater perpendicularly to the bearing surface. This allows a compact design of the press.

According to a further embodiment of the apparatus according to the invention, the heater comprises a plate and at least one first heating element for heating the plate, wherein the respective heating element is disposed on a side of the plate facing away from the bearing surface. The plate affords the advantage that it is suitable as a gastight dividing wall. The plate is preferably made of a material having high stiffness and high thermal conductivity, for example, of a metal, e.g. steel or aluminum. The plate thus ensures on the one hand a precise controllable transmission of force during pressing of the respective solar module and a heat flow uniformly distributed over the entire plate.

In a further development of the aforesaid embodiment, an elastically deformable body is disposed on the plate of the heater on a side facing the bearing surface in such a manner that on pressing the solar module, the respective solar module is separated from the plate by means of this elastically deformable body, wherein the elastically deformable body has a stiffness which is less than the stiffness of the plate. The elastically deformable body can, for example, be configured as a mat formed from an elastic material or as a cushion filled with a liquid. The shell of the cushion filled with liquid can be made of an elastic material such as rubber or of thin metal sheet.

For laminating, the heater is brought into contact with the solar module, wherein pressure is exerted uniformly on a surface of the solar module. The elastically deformable body disposed on the side of the plate of the heater facing the solar module can compensate for unevennesses of the plate and/or the solar module or spatial fluctuations of the distance between the plate of the heater and the solar module. Primarily, however, edge pressures which occur at edge regions of the solar modules are thus reduced or avoided. In addition, the corresponding side of the heating element need not be designed to be flat, which is particularly advantageous for tubular or rod-shaped heating elements. The heating element or the plate and/or the elastically deformable body form an air-impermeable separating device. It is furthermore advantageous if the elastically deformable body has a high thermal conductivity in order to optimise the heat transfer from the heating element of the heater to the solar module.

It is particularly advantageous if the respective press part has at least one lifting element, in particular a cylinder at which the pressing device is articulated. The vertical movement of the heater can be accomplished simply by means of a cylinder. The cylinder is connected to the heater on a side of the heater opposite to the solar module. The cylinder is connected to the respective press part in such a manner that no leaks occur in the pressing chamber due to the articulation of the cylinder. In particular, the articulation point has a seal. The respective press part advantageously has a plurality of cylinders at which the pressing device is articulated. As a result, the cylinders can be selected to be larger or smaller and the uniform movement of the pressing device is made easier.

According to a preferred further development, the lower press part has a bearing plate for the solar module, wherein a second heating element is disposed in the bearing plate. The bearing plate is used for supporting the solar module in the second press part. Ideally, the bearing plate is integrated in the second press part, in particular is connected in one piece to said press part. As a result of the integration of the further heating element in the bearing plate, the solar module can be heated on both sides. As has already been explained above, the solar module has a film on both sides, which is laminated by means of the pressing process. The bilateral heating of the solar module affords the advantage that the heating elements can each be configured to be smaller than would be the case if the solar module were only heated on one side. Furthermore, the bilateral heating can also shorten a warm-up phase of the solar module, which allows time and financial advantages in the manufacture of the solar module.

A further embodiment of the press according to the invention is fitted with one or more spacers for limiting a distance between the heater and the bearing surface, wherein the respective spacer is disposed in such a manner that the respective spacer blocks a movement of the heater directed to the bearing surface when the distance between the heater and the bearing surface reaches a predetermined value. The respective spacer can, for example, be a body disposed between the bearing surface and the heater. The respective spacer can, for example, be a body fastened to the heater, wherein the press comprises a mechanical stop for the spacer. Alternatively, the respective spacer can be a body disposed on the bearing surface, which forms a mechanical stop for the heater.

According to a preferred embodiment of the invention, the spacer is configured as a supporting frame and is disposed in a region of the bearing plate, in particular running around a corresponding solar module, wherein the supporting frame preferably has a height which approximately corresponds to a height of a solar module, in particular a finished solar module, for supporting the heater. This prevents the heater from being able to be driven laterally below the height of the solar module and prevents edge pressure from occurring which could cause damage to the solar cells on the one hand and to the heater on the other hand. In addition, supporting the heater on the supporting frame ensures that a force applied to the solar module is not too great.

According to a further development of the invention, the supporting frame is not configured to be circumferential. Rather, the supporting frame comprises a plurality of supporting frame elements which together fulfil a supporting function. Thus, instead of a closed frame, individual plate-shaped elements or parts are also provided which in addition are individually arranged on the lower press part. In order to compensated for non-uniform deformations of the heater, the supporting frame elements can have different heights. The elements are arranged spaced apart from one another on the press part. Alternatively, they can also be arranged free from gaps.

According to a further exemplary embodiment and alternatively to the previous exemplary embodiments, the supporting frame is articulated to the first press part, the supporting frame being in contact with the bearing plate when the first press part is supported on the second press part. Due to the articulation of the supporting frame on the first press part, the bearing plate has a receptacle for the solar module. In addition, the bearing plate is configured to be flat. The supporting frame is disposed in the upper press part in the region of the heater. As a result, the supporting frame with the pressing device can be driven vertically inside the cavity.

According to a preferred further development of the invention, a seal is disposed between the first and the second press part which serves as a seal with respect to the surroundings of the cavity. A contact surface between the press parts should be sealed in order to produce a vacuum inside the cavity.

According to a particularly advantageous further development of the invention, the first heating element comprises adjacently disposed heating means for uniform thermal irradiation distributed over the heating element. The adjacently disposed heating means can be tubes through which a heating medium can be transported, in particular a fluid. Oil or another suitable liquid is suitable as heating medium.

According to a particularly advantageous further development, the solar module is heated by hot air introduced into the cavity. The first chamber is subjected to compressed air during the laminating process, this compressed air being supplied via the ventilation and venting channel and being heated outside the laminating press. As a result, the heating element is heated which, when supported on the solar module, releases the heat to said module. The first chamber can alternatively be heated by radiant heaters which are disposed on the first press part inside the first chamber. According to a particular further development, induction coils are articulated on the first press part inside the cavity which inductively heat the heating element.

Preferred exemplary embodiments are explained in detail hereinafter with reference to the drawings. In the figures.

FIGS. 1 to 4 show a laminating press 1 in longitudinal section. The laminating press 1 is a device for laminating solar modules which usually have a multi-layer structure. FIGS. 1 to 4 show a single solar module 2 which has only one layer for better illustration.

The laminating press 1 is substantially divided into two parts, i.e. comprising a first press part 3 and a second press part 4. The two press parts 3 and 4 correspond to one another and are movable with respect to one another. A device which connects the two press parts to one another is not shown in the figures. The first and second press parts 3 and 4 are arranged above one another in the vertical direction, the second press part 4 being located below the first press part 3. The second press part 4 which is provided to receive the solar module 2 is accordingly also designated as lower press part. The first press part 3 is accordingly also designated as upper press part. The first press part 3 comprises a cover 5 which is disposed substantially parallel to the second press part 4.

A larger recess 6 is disposed on the side of the cover 5 directed towards the second press part 4. This recess 6 is delimited laterally and enclosed by projections 7. The projections 7 are configured to be circumferential so that the recess 6 forms a type of inverted cavity or trough.

The cover 5 has a plurality of openings which are configured as vertical holes. Such a hole serves as a ventilation and venting channel 8 and is disposed centrally in the cover 5. In addition to the ventilation and venting channel 8 shown in the figures, other ventilation and venting channels can be provided in the cover 5. Further openings disposed in the cover 5 serve as a receiving shaft 9 for respectively one lifting element. FIGS. 1 to 4 each show two receiving shafts 9, wherein the laminating press 1 has further receiving shafts with lifting elements.

The lifting elements which are disposed in the receiving shafts 9 are configured as cylinders 10 and are pneumatically operated. On an upper side 11 of the cover 5, devices 12 in which the cylinders 10 are mounted are provided in each case above the receiving shafts 9. The devices 12 are dimensioned in such a manner that pistons 13 of the cylinders 10 are substantially disposed in the receiving shafts 9 and mount the cylinder 10 in the devices 12. The pistons 13 are configured to be longer than the receiving shafts 9 and extend into the recess 6 of the cover 5. A seal 14 which seals the receiving shaft 9 with respect to the recess 6 is disposed in an end region of the receiving shafts 9. In the present exemplary embodiment the seal 14 is configured as an annular seal which laterally encloses the piston 13 of the lifting element.

A heater 15 is articulated at the end of the pistons 13 which project into the recess 6 of the cover 5. The heater 15 extends for the most part between the pistons 13. The heater 15 comprises a continuous plate 17 and a heating element 16, the heating element 16 being disposed on the side of the plate 17 facing away from the solar module 2 and comprising a plurality of heating means 18 in the present example. The plate 17 is configured in such a manner that it can easily be connected to the ends of the pistons 13. Alternatively to this, the plate 17 is articulated to the pistons 13 via connecting means not shown in the figures. An elastically deformable body 19 is disposed on an underside of the heating element 16, which body abuts flat against the plate 17 and points in the direction of the lower press part 4.

The body 19 is disposed in such a manner that the respective solar module 2 is separated from the plate 17 by means of this body 19 when pressing the solar module 2, the body 19 having a stiffness which is lower than the stiffness of the plate 17. The body 19 can be implemented in various ways, e.g. as a mat formed from an elastic material or as a cushion filled with a liquid.

The body 19 is connected to the plate 17 predominantly mechanically. The connection by means of an adhesive is alternatively possible provided that adhesive properties provided for the adhesive are also maintained under heat generated by the heating element 16. The body 19 is formed from a flexible material having particularly high thermal conductivity.

The first press part 3 comprises cover 5 and a sealing apparatus 39.

The sealing apparatus 39 is disposed in the region of the projections 7, this apparatus comprising:
 a sealing frame 20, hereinafter called for simplicity "frame 20", having a first contact surface 20.1 for the cover 5 of the first press part 3 and having a second contact surface 20.2 for the second press part 4,
 a seal 24 disposed on the first contact surface 20.1 between the cover 5 and the frame 20 and
 a seal 25 disposed on the second contact surface 20.2 between the frame 20 and the second press part 4.

The frame 20 is held by bolts 21 which are articulated on an outer side 22 of the cover 5. The bolts 21 hold the sealing frame 20 in position in the region of the projections 7 in such a manner that they are held at a distance from the end region 23 of the projections 7. The frame 20 is thus disposed between the cover 5 of the first press part 3 and the second press part 4.

The seal 24 is disposed on a side of the frame 20 situated toward the projections 7. The seal 24 has a small recess which accommodates a cord seal which projects sufficiently far from the recess so that the cord seal is in contact with the projections 7. The cord seal is moreover formed from a flexible and compressible material.

The seal 25 is disposed on a side of the frame 20 pointing towards the second press part 4 opposite to the seal 24 and has approximately the same structure as the seal 24. A cord seal of the seal 25 is likewise formed from a flexible material, wherein in an open state of the laminating press 1, the seal 25 does not abut against the second press part 4.

The frame 20 has a device which makes it possible to provide a sealing body 26 on the frame 20. The sealing body 26 is disposed on the frame 20 in a connectionless manner, the sealing body 26 rests on the frame 20 and is therefore only loosely connected to this. The sealing body 26 extends substantially from the frame 20 into the recess 6 of the cover 5. The frame 20 is accordingly configured so that it ends in a region below the recess 6. As is apparent from FIG. 1, the heater 5 has an angle element 27 which is located at the edge of the plate 17 or an end of the piston 13. Sealing body 26 is disposed between the frame 20 and the angle element 27. In the present exemplary embodiment, a lower region of the sealing body 26 is loosely connected to the frame 20 and an upper region is brought into contact with the heater 15 via the angle element 27, the sealing body 26 only resting on the respectively adjoining parts. Only a small amount of vertical play exists due to suitable design of the stroke of the (pneumatic) cylinder 10. The pneumatic cylinders 10 are extended to allow the sealing function.

The sealing body 26 is likewise formed from a flexible material, with the result that the sealing body 26 can be compressed and then returned to its original shape after unloading. The sealing body 26 is configured to be circumferential like the frame 20 (around the solar module 2). The angle element 27 is also configured to be circumferential and together with the sealing body 26 describes a closed ring.

The heater 15 with the heating element 16 and the body 19 are configured to be airtight so that the heater 15 with the sealing body 26, the frame 20 and the cover 5 forms a closed and sealed unit. The cavity formed by the recess 6 in the cover 5 is closed in an airtight manner in the direction of the second press part 4 located below the first press part 3 by means of the seal 24 in the region between the projections 7 and the frame 20. Air can be supplied and removed exclusively via the ventilation and venting channel 8.

The second press part 4 has a bearing plate 28 which is located below the cover 5. On a side of the bearing plate 28 pointing towards the cover 5, a bearing surface 29 for the respective solar module 2 is formed and a supporting frame 30 is provided. The supporting frame 30 approximately corresponds to a height of the solar module 2 and spans a surface between individual frame sections which is larger than a solar module 2 to be laminated. The dimensions of the supporting frame 30 approximately correspond to the extension of the heater 15 parallel to the bearing surface 29. The supporting frame 30 serves as a mechanical stop for the heater 15 and in the present case has the function of a spacer which limits the distance between the heater 15 and the bearing surface 29 and blocks a movement of the heater 15 directed towards the bearing surface 29 when the distance between the heater 15 and the bearing surface 29 reaches a predetermined value which in the present case corresponds to the extension of the supporting frame 30 vertically to the bearing surface 29.

The bearing plate 28 has a further heating element which is not shown in the figures. The further heating element is disposed directly below the bearing surface 29 in the region where the solar module 2 rests on the bearing plate 28. The further heating element heats the solar module 2 from below when the solar module 2 rests on the bearing plate 28.

Figure 1:
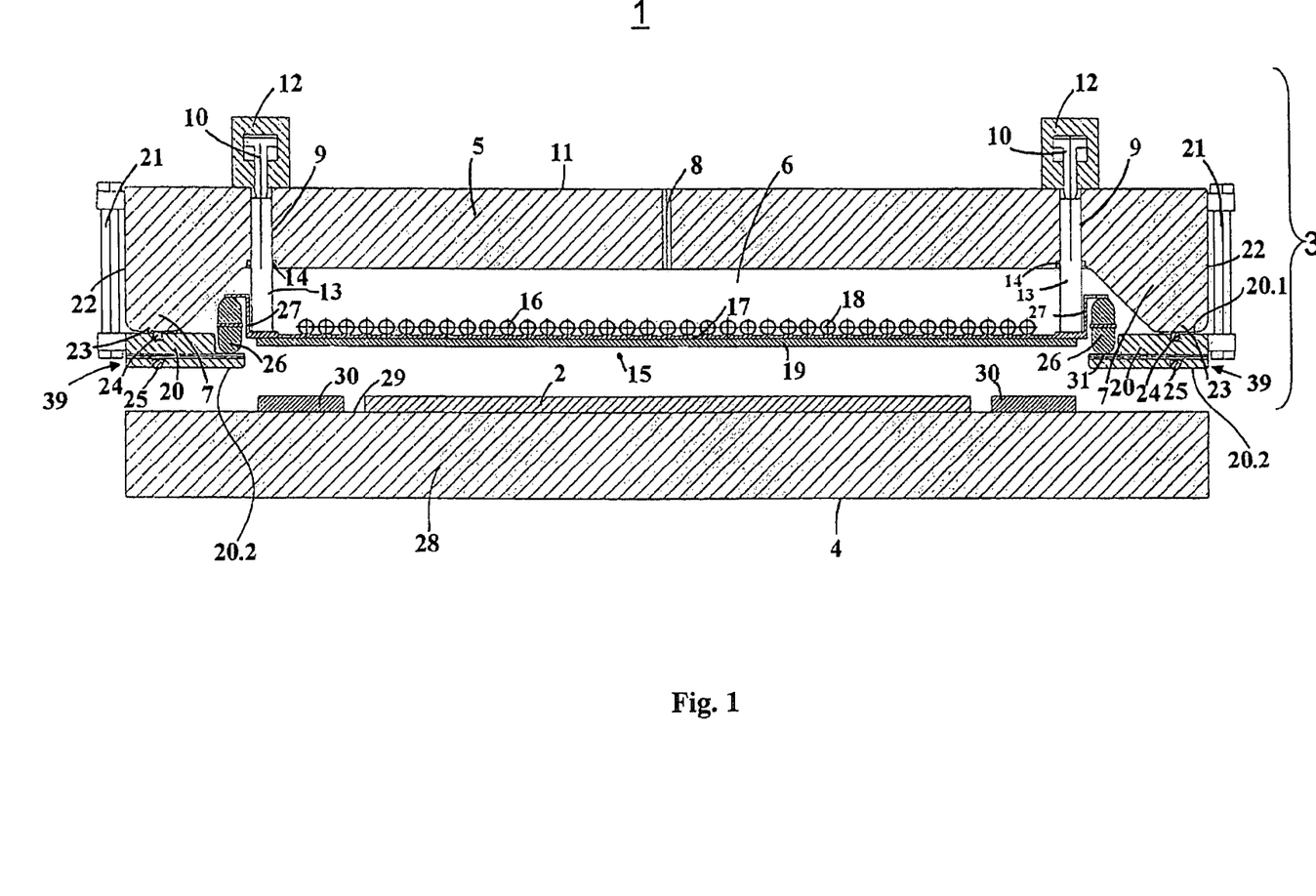
FIG. 1 shows a longitudinal section through a first embodiment of a laminating press in the open state.

The function of the laminating press 1 and the process of laminating a solar module 2 is explained in detail hereinafter. FIG. 1 shows a laminating press 1 in the open state in which a first (upper) press part 3 is located at a distance from a second (lower) press part 4. The two press parts 3 and 4 correspond to one another and have substantially the same width. A solar module 2 is already positioned on the bearing plate 28 of the second press part. The solar module 2 is disposed approximately centrally, at least however within the supporting frame 30. The supporting frame 30 is dimensioned in such a manner that it is at a distance on both sides of the solar module 2.

The cylinders 10 allow the heater 15 to be driven in the vertical direction inside the laminating press 1. The heater 15 is aligned approximately parallel to the solar module 2 which is disposed on the bearing plate 28. Due to the movement of the heater 15 in the vertical direction, the heater 15 is driven so that it remains parallel to the solar module 2 and the bearing plate 28.

Figure 2:
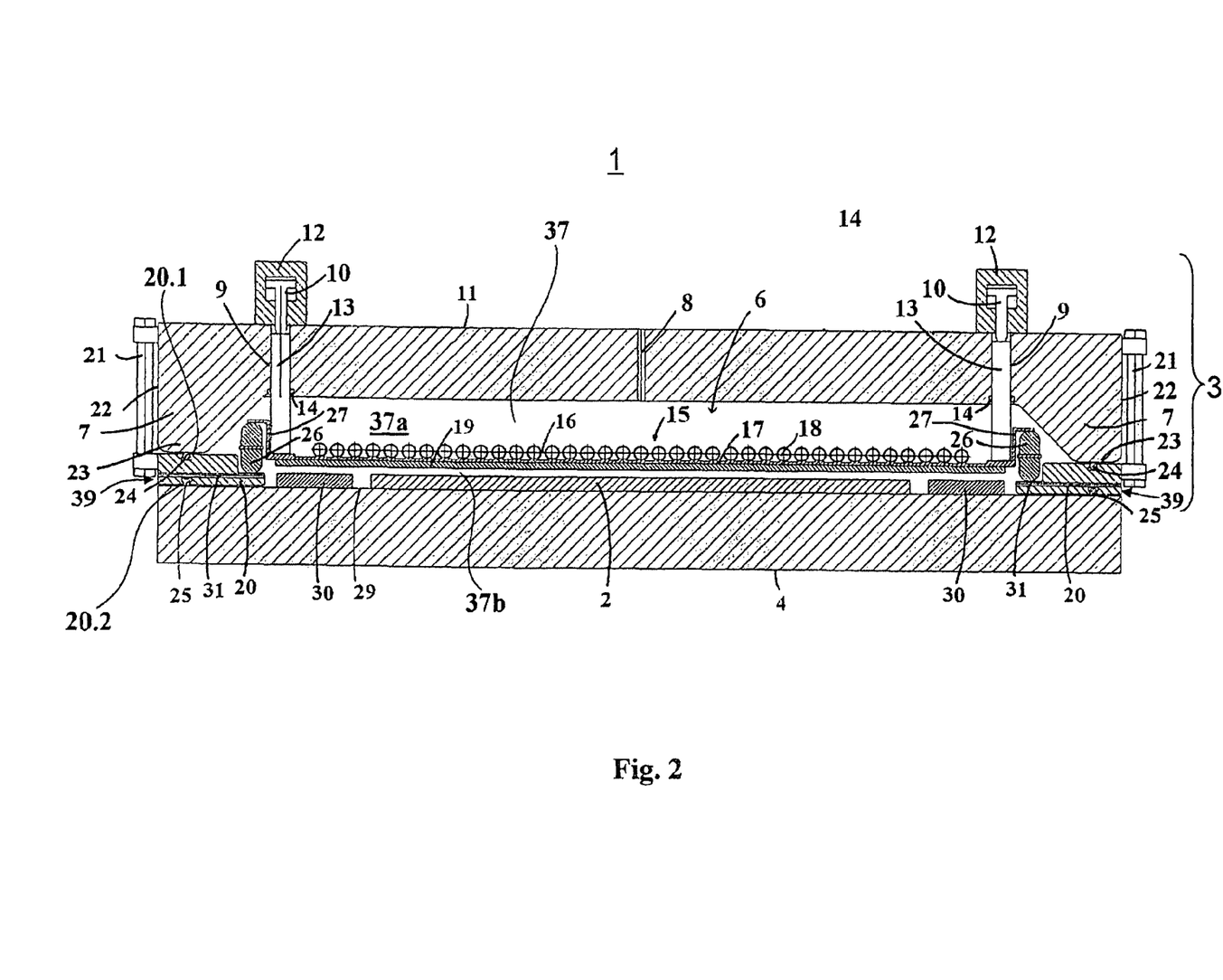
FIG. 2 shows a longitudinal section through the laminating press from FIG. 1, the laminating press being shown in the closed state.

FIG. 2 shows the laminating press 1 in a closed state. In this case, the first press part 3 is lowered onto the second press part 4. Due to the special formation of the first press part 3 with the recess 6 and the projections 7, a cavity 37, also called pressing chamber, is formed in which the solar module 2 is laminated. The cavity 37 is divided into two partitions, that is into a first chamber 37a and a second chamber 37b, wherein the first chamber 37a is disposed in the region of the first press part 3 and the second chamber 37b is disposed in the region of the second press part 4. The division of the cavity 37 into the two chambers 37a and 37b is substantially achieved by the heater 15 and the sealing body 26, wherein in the present case the sealing body 26 is brought into contact with the heater 15 via the angle element 27 and with the first press part 3 via the frame 20. The sealing body 26 and the heater 15 accordingly form an airtight boundary between the first chamber 37a and the second chamber 37b.

The first chamber 37a and the second chamber 37b can each be evacuated and subjected to compressed air. For this purpose, the cover 5 has the ventilation and venting channel 8 via which air can be withdrawn and supplied to the first chamber 37a. When the first press part 3 is lowered, the second chamber 37b is also closed in an airtight manner and only accessible via at least one ventilation and venting channel 31. The ventilation channel 31 is disposed in the frame 20 and runs approximately horizontally from the second chamber 37b and opens into the space outside the laminating press 1. In the present example, the second chamber 37b is bounded by the bearing plate 28, the frame 20 and the means which separate the first chamber 37a from the second chamber 37b (i.e. heater 15 and sealing body 26).

Since the cavity 37 is divided by means of the sealing body 26 and the heater 15 into two chambers 37a and 37b separated from one another in a gastight manner, the two chambers 37a and 37b can be evacuated or subjected to pressure independently of one another. Thus, for example, a vacuum can be generated in both chambers in order to degas the solar module 2 before the laminating process. The vacuum in the first chamber 37a serves as compensation for the vacuum in the second chamber 37b. The vacuum in the first chamber 37a prevents the heater 15 together with the heating element 16 from being pulled down onto the solar module 2. FIG. 2 shows a process section in which no pressure is yet applied to the solar module 2 by the heater 15.

Figure 3:
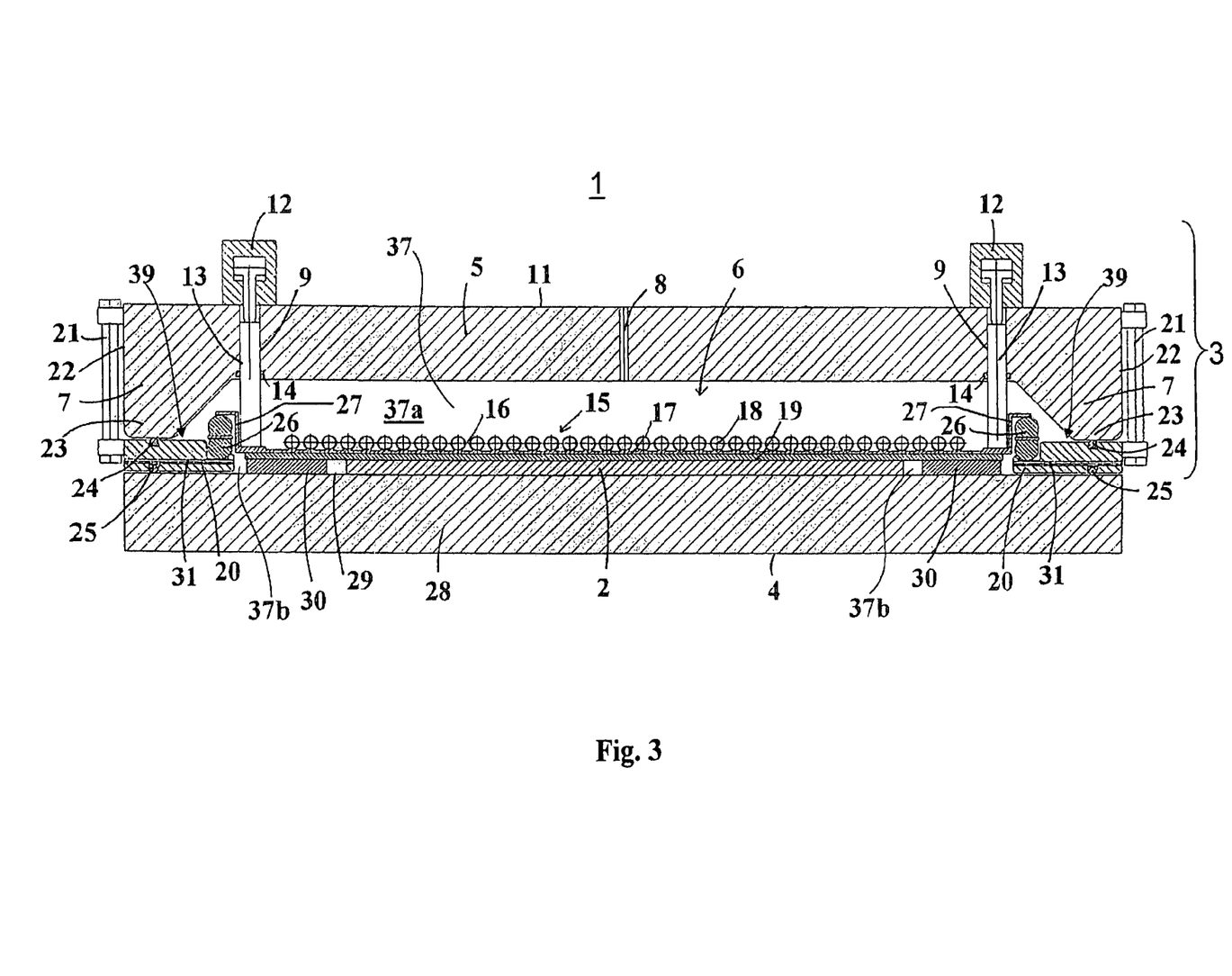
FIG. 3 shows a longitudinal section through the laminating press in the closed state according to FIG. 2, during pressing of a solar module.

FIG. 3 shows an actual laminating process. In this case, the cylinders 10 are extended and the heater 15 rests on the supporting frame 30. Due to the corresponding height of supporting frame 30 and solar module 2, the heater 15 is also in contact with the side of the solar module 2 facing the heater 15. The sealing body 26 disposed laterally on the heater 15 is compressed in this process step. During the laminating, a vacuum is present in the second chamber 37b whereas the first chamber 37a is exposed to an excess pressure. This excess pressure helps to press the heater 15 onto the solar module 2. By this means, a pressure is exerted on the solar module 2. In order to ensure that the pressure is distributed as uniformly as possible over the surface of the solar module 2, the heater 15 comprises the (elastically deformable) body 19 which is disposed between the heating element 16 and the plate 17 of the heater 15 and the solar module 2. This can avoid undesirable edge pressures which excessively load margins or edges of the solar module 2.

The supporting frame 30 is used for supporting the heater 15, in particular for supporting the heating element 16 during the pressing process. Due to the height of the supporting frame 30 and the solar module 2 being approximately the same, the heater 15 is lowered to a defined height so that no punctiform or linear forces act on the solar module 2.

Figure 4:
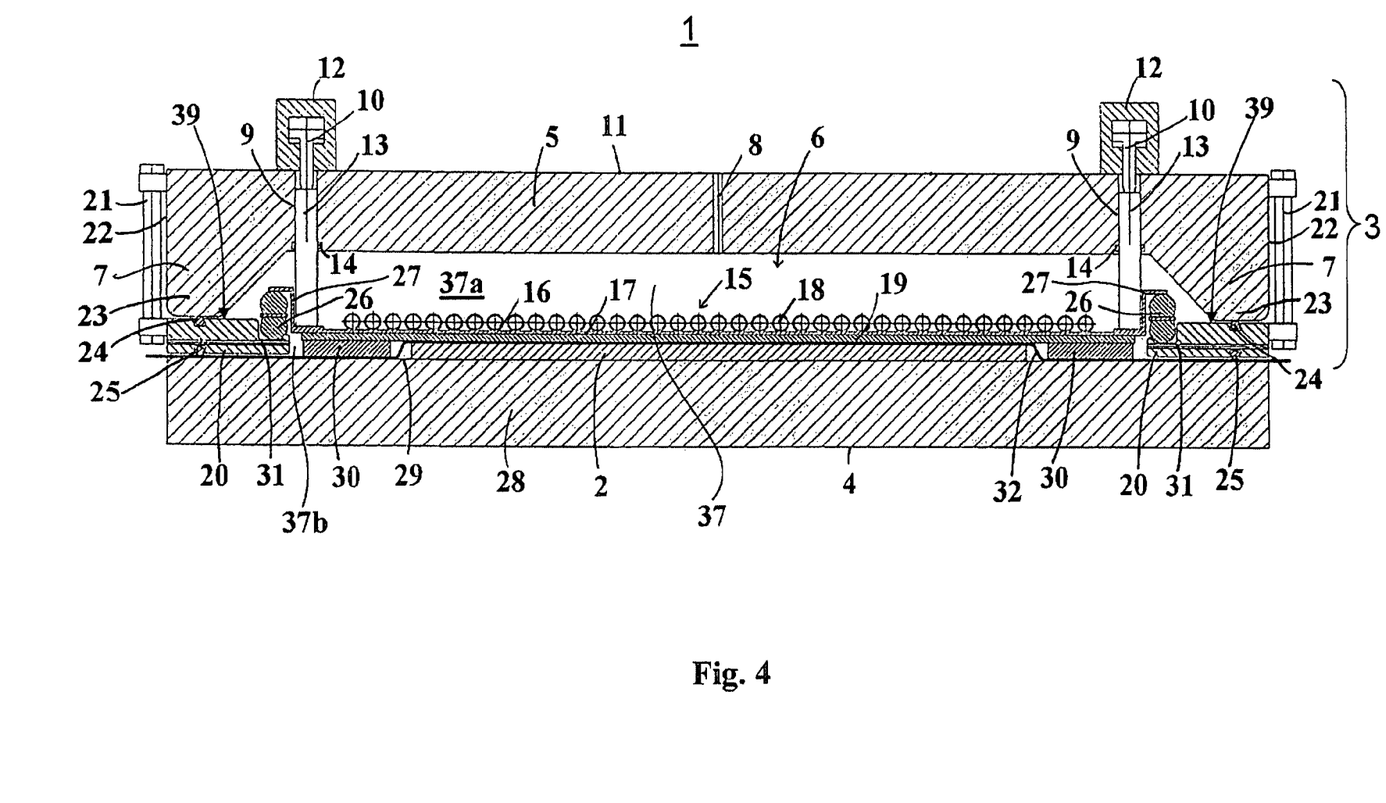
FIG. 4 shows a longitudinal section through the laminating press in the closed state according to FIG. 3, during the laminating process.

In a further exemplary embodiment of the invention, it is also feasible to prevent contamination of the body 19 when the solar module 2 is laminated. For this purpose, as shown in FIG. 4, a protective film 32 is positioned between the heater 15 or the body 19 and the solar module 2. The protective film 32 is advantageously guided between supporting frame 30 and the bearing plate 28 and is clamped by the frame 20 in end regions of the bearing plate 28. The supporting frame 30 is only loosely disposed on the bearing plate 28 and is positioned during the preparation of the laminating process as soon as the solar module 2 is applied to the bearing plate 28. Thus, during this process step it is easily possible to arrange a protective film 32 so that the desired protection is achieved and at the same time, the protective film 32 is held in the desired position.

Figure 5:
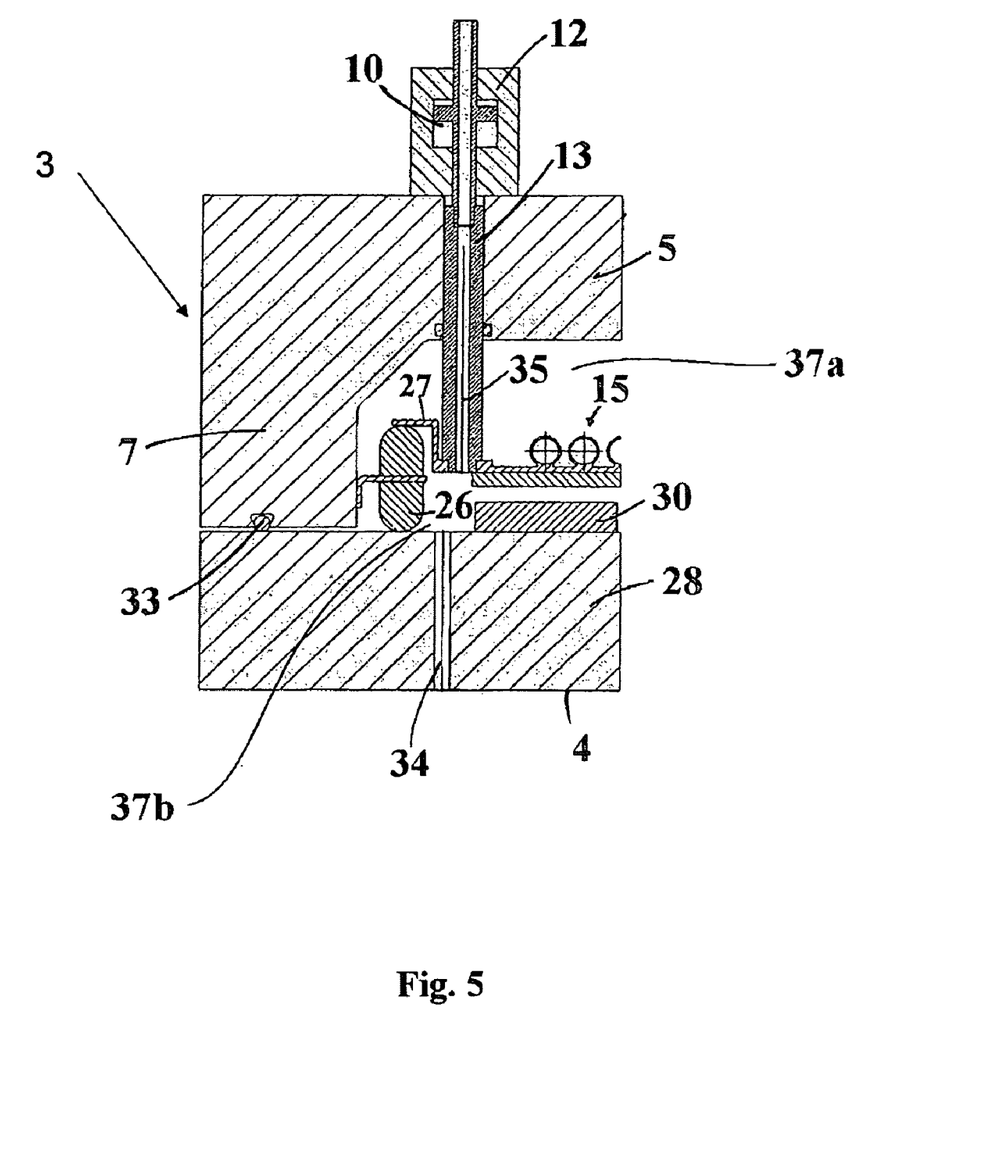
FIG. 5 shows a section of an end region of a second embodiment of the laminating press (shown in the closed state)

FIG. 5 shows a further exemplary embodiment of the invention according to which the laminating press 1 is designed without a frame 20. In this case, the end region of the projections 7 has a single seal 33 which is designed as a cord seal like the seals 24 and 25 mentioned in connection with the frame 20 from FIGS. 1-4. The sealing body 26 is directly connected to the projections 7 and forms a lateral seal of the first chamber 37*a*. In the second exemplary embodiment, the evacuation or the ventilation of the second chamber 37*b* is accomplished in two ways. On the one hand, the bearing plate 28 has a ventilation and venting channel 34 which opens into the second chamber 37*b* and on the other hand, it is possible to achieve a ventilation and venting of the second chamber 37*b* through the cylinder 10 or the piston 13, wherein the cylinder 10 and the piston 13 have a centrally disposed channel 35 for this purpose.

Figure 6:
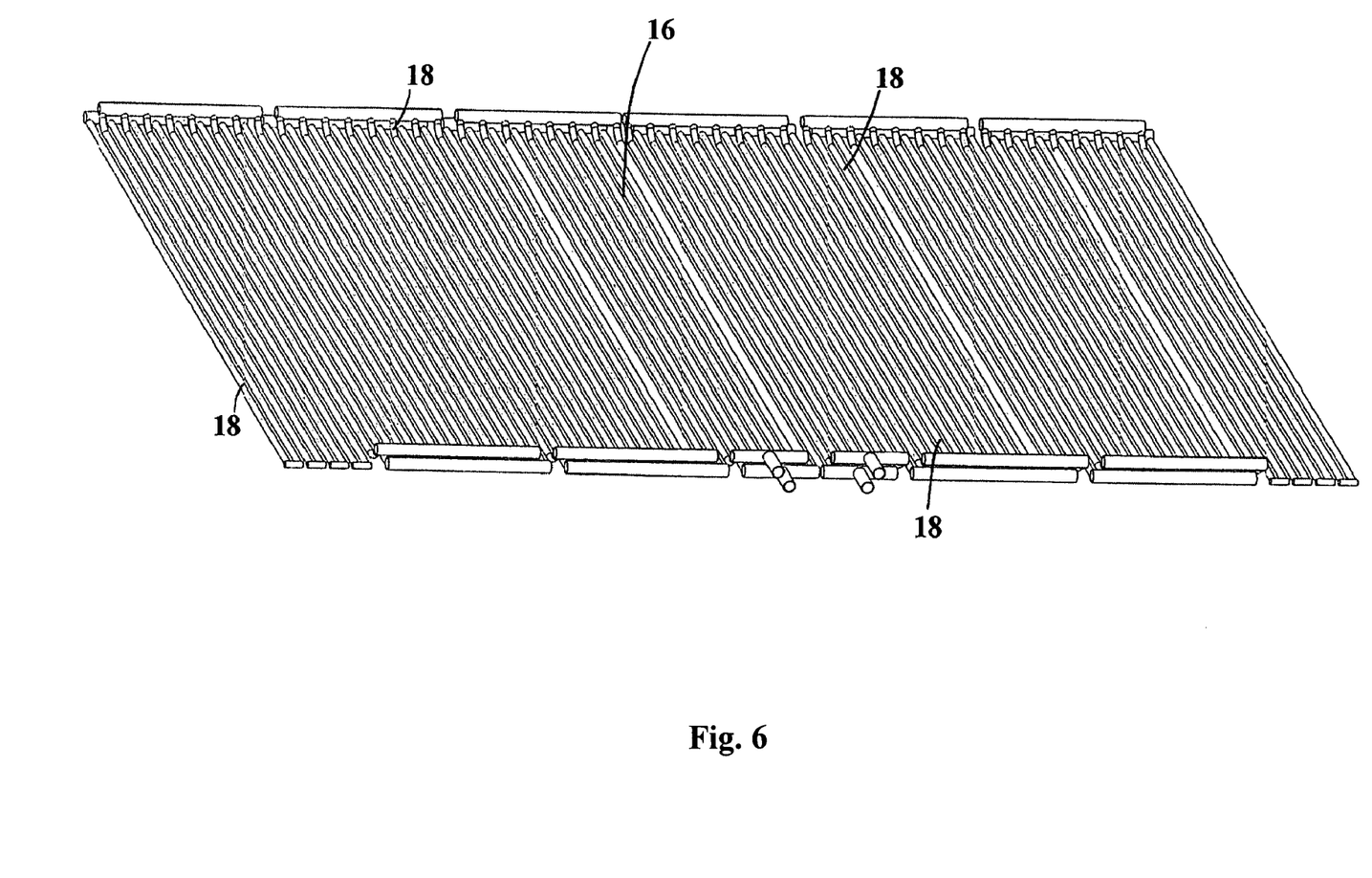
FIG. 6 shows a perspective plan view of a heating element.

FIG. 6 shows a heating element 16 used in the embodiments from FIGS. 1-5. The heating element 16 consists of adjacently disposed heating means 18. The heating means 18 can be differently configured. On the one hand, the heating means 18 are designed as tubes provided with a cavity through which a fluid circulates. A heated oil or another suitable liquid are particularly suitable as fluid. In addition, hot air or another heated gas can be used as heating medium. Alternatively to this, the heating means are feasible as resistance heating means or as inductive heating means which are disposed above the plate 17 of the heater 15. If the heating means 18 is designed as a tubular construction, a possible arrangement of the tubes is such that tubes from a feed are always located adjacent to tubes from a return.

Figure 7:
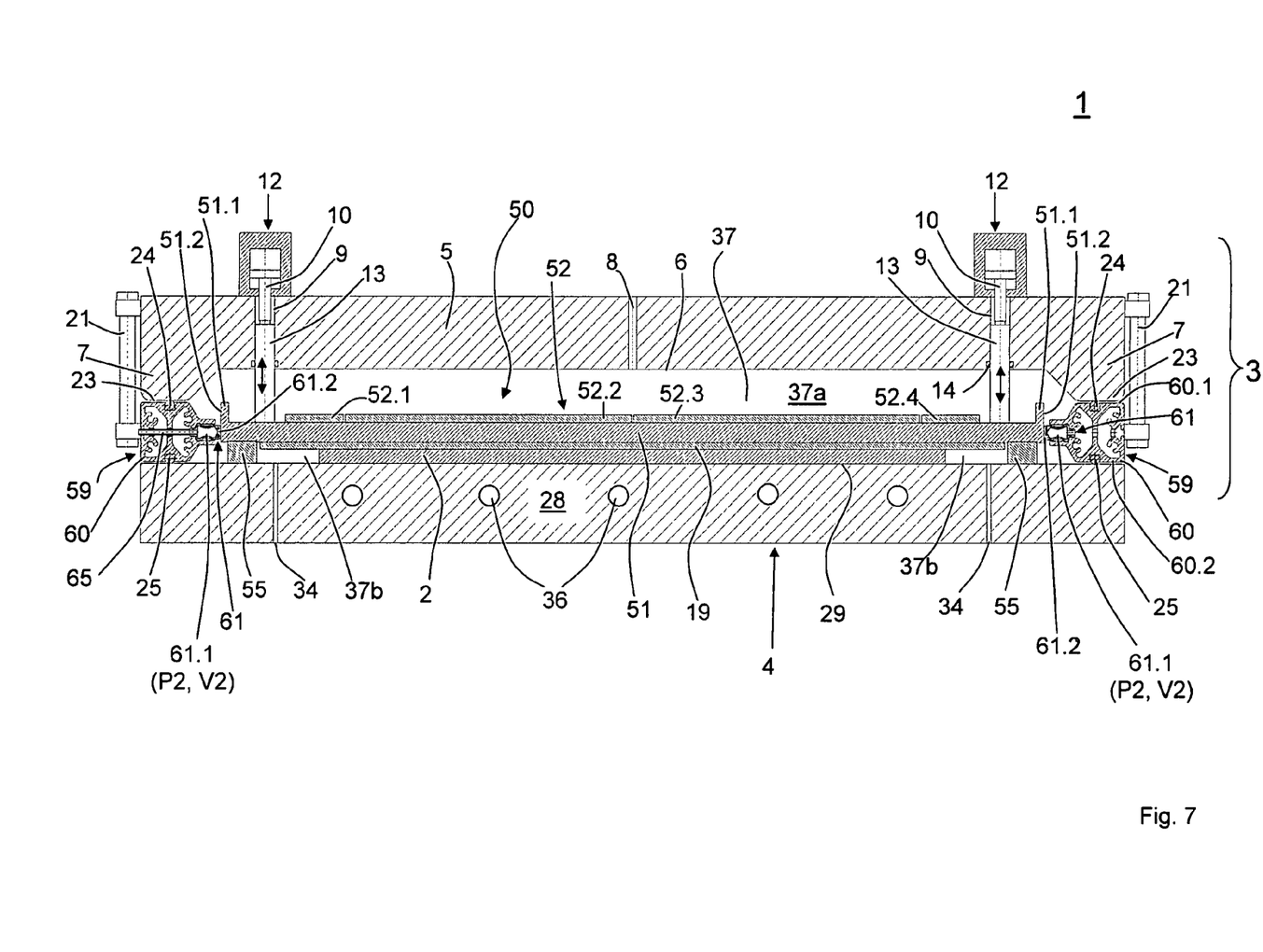
FIG. 7 shows a longitudinal section through a third embodiment of the laminating press (shown in the closed state) with a closed connection between a first chamber and a second chamber in a cavity.
Figure 8:
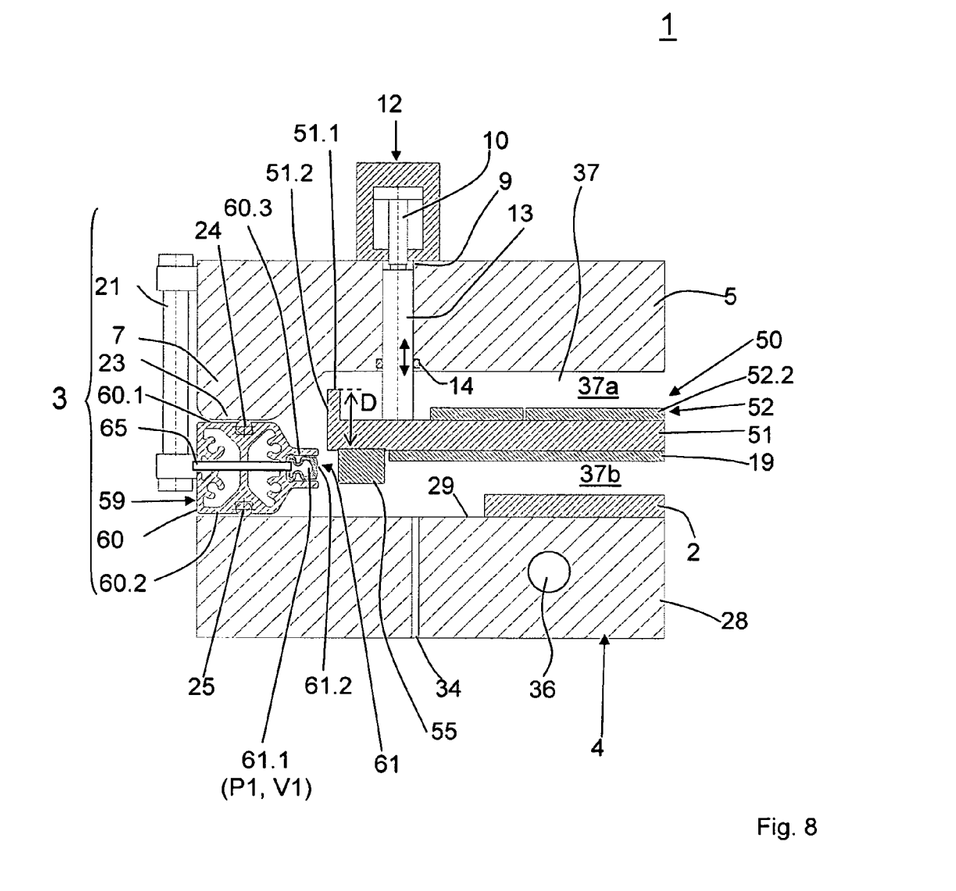
FIG. 8 shows a longitudinal section according to FIG. 7, wherein the connection between the two chambers is open.

FIGS. 7 and 8 show another embodiment of the apparatus for laminating a solar module according to the invention. This embodiment comprises a laminating press 1 for pressing and heating a solar module 2.

The laminating press 1 according to FIGS. 7 and 8 and the embodiments of the laminating press 1 according to FIGS. 1-6 differ in regard to various details but otherwise have a number of features which are the same or which have the same effect, wherein in each case features of the various embodiments of the laminating press 1 according to FIGS. 1-8 which are the same or which have the same effect are provided with identical reference numerals. Therefore, essentially the differences between the embodiment according to FIGS. 7 and 8 and the embodiments according to FIGS. 1-6 will be explained hereinafter.

The laminating press 1 according to FIG. 7 comprises (like the laminating press according to FIGS. 1-4) a first press part 3 and a second press part 4, which press parts are movable relative to one another and (as in the case of the closed position of the laminating press 1 shown in FIGS. 7 and 8) can be brought into a position in which a cavity 37 is formed between the first press part 3 and the second press part 4, which cavity can be vented or ventilated via a venting and ventilation channel 8 formed in the first press part 3 and/or via venting and ventilation channels 34 formed in the second press part 4.

The second press part 4 of the laminating press 1 according to FIG. 7 comprises a substantially horizontally disposed (bearing) plate 28 in the present example, on the upper side whereof a (in the present example, flat) bearing surface 29 is formed for the respective solar module 2. The laminating press comprises a second heating element which serves to heat the plate 28. In the present example according to FIGS. 7 and 8, this second heating element is implemented as a system of interconnected channels 36 which are formed in the plate 28 and through which a heating fluid can circulate. It is also possible to make a cooled fluid circulate through the channels 36 in order to cool the plate 28.

The laminating press 1 according to FIGS. 7 and 8 substantially differs from the laminating press according to FIGS. 1-4 by the constructive details of a heater 50 specified hereinafter (compared to the heater 15 according to FIGS. 1-4) and the constructive details of a sealing apparatus 59 specified hereinafter (compared to the sealing apparatus 39 according to FIGS. 1-4).

The heater 50 is configured to be substantially plate-shaped and comprises a plate 51 disposed substantially parallel to the bearing surface 29 (made of a heat-conductive material, for example, a metal, e.g. steel) and a heating element 52 for heating the plate 51. In the present case, the heating element 52 comprises a plurality of heating mats 52.1, 52.2, 52.3 and 52.4 which can be heated by means of electrical resistance heating, which are disposed on the side of the plate 51 facing away from the bearing surface 29.

As FIGS. 7 and 8 show, the plate 51 has a side wall 51.1 at its edge, which extends in a plane parallel to the bearing surface 29 smoothly along the edge of the plate 51 and in addition, perpendicularly to the bearing surface 29 in such a manner that the side wall on the respective outer side has a side surface 51.2 extending perpendicularly to the bearing surface 29.

As FIGS. 7 and 8 show, the heater 50 is fastened on the first press part 3 with the same means as the heater 15 on the first press part 3 in the case of the laminating press 1 according to FIGS. 1-4, i.e. with the aid of the respective device 12 for mounting the respective cylinder 10 and the piston guided in the respective receiving shaft 9 and connected to the cylinder 10 and the plate 51 of the heater 50, it is possible to move the heater 50 vertically in relation to the bearing surface 29 and reduce or enlarge the distance of the heater 50 in relation to the bearing surface 29 (as indicated in FIGS. 7 and 8 by double arrows in the longitudinal direction of the piston 13) to allow pressing of the respective solar module 2. As FIGS. 7 and 8 show, in each case one end of the respective piston 13 is fastened to the plate 51 in the vicinity of the side wall 51.1.

As FIGS. 7 and 8 further show, an elastically deformable body 19 is disposed on the plate 51 on the side facing the bearing surface 29 in such a manner that the respective solar module 2 is separated from the plate 51 during pressing of the solar module 2 by means of the body 19. The body 19 preferably has a stiffness which is lower than the stiffness of the plate 51. The body 19 is furthermore dimensioned so that in a projection onto a plane parallel to the bearing surface 29, it covers a larger area than the respective solar module 2. The body 19 is furthermore preferably made of a heat-conductive material in order to ensure that the heating element 52 can produce the largest possible heat flow through the body 19.

FIGS. 7 and 8 show the heater 50 in two different positions. In the case of FIG. 8, the heater is far removed from the bearing surface 29 in such a manner that the body 19 is no longer brought into contact with the solar module 2. In the case in FIG. 7, the heater is placed close in relation to the bearing surface 29 in such a manner that the body 19 is brought into contact with the solar module 2 and the solar module 2 is set under pressure or pressed.

The body 19 (compared to the case where the body 19 is not placed between the plate 51 and the solar module 2) has the effect that the forces acting on the respective solar module 2 during pressing can be distributed as homogeneously as possible over the solar module 2. Since the body 19 has a lower stiffness than the plate 51, spatial pressure fluctuations along the surface of the solar module 2 are reduced. In particular, it is achieved that the respective solar module 2 is not loaded by excessively large forces in the region of edges at the margin of the solar module 2 (reduction of edge pressures).

As shown in FIGS. 7 and 8, the laminating press is equipped with one or more spacers 55 which limit a distance between the heater 50 and the bearing surface 29. The respective spacers 55 are disposed in such a manner between the heater 50 and the bearing surface 29 that the respective spacer 55 blocks a movement of the heater 50 directed towards the bearing surface 29 when the distance between the heater 50 and the bearing surface 29 reaches a predetermined value. In the present case, the respective spacers 55 are fastened to the plate 51 and in particular are located in the vicinity of an edge of the plate 51 on the side facing the bearing surface 29. In the present case the bearing surface 29 serves as a mechanical stop. A movement of the heater 50 directed towards the bearing surface 29 is accordingly blocked when the respective spacers impact against the bearing surface 29 (as shown in FIG. 7). The spacers 55 prevent the heater 50 from being bent and possibly damaged during pressing of the respective solar module 2. In order to achieve an optimal effect, an optimal size of the respective spacer 55 is selected as a function of the dimensions of the respective solar module.

The sealing apparatus 59 comprises:
  a sealing frame 60, hereinafter called for simplicity "frame 60", comprising a first contact surface 60.1 for the cover 5 of the first press part 3 and comprising a second contact surface 60.2 for the second press part 4,
  a seal 24 disposed on the first contact surface 60.1 between the cover 5 and the frame 60 and
  a seal 25 disposed on the second contact surface 60.2 between the frame 60 and the second press part 4.

When the laminating press 1, as shown in FIGS. 7 and 8, is brought into the closed position, the sealing apparatus 59 is then brought into contact both with the cover 5 of the first press part 3 and also with the second press part 4 in order to seal the cover 5 with respect to the second press part 4. In the present example, the sealing apparatus 59 is fastened to the cover 5 (by means of bolts 21) and can therefore be removed together with the cover 5 from the second press part 4 in order to bring the laminating press 1 into an open position and allow loading of the laminating press 1 with the respective solar module 2. For this reason, for the sake of simplicity the sealing apparatus 59 is considered in this connection as part of the first press part 3. It should be noted that this assignment of the sealing apparatus 59 to the first press part 3 is arbitrary and does not limit the invention. The sealing apparatus 59 could alternatively also be fastened to the bearing plate 28 and be considered as part of the second press part 4 or it can be fastened neither to the cover 5 nor to the bearing plate 28 and in this case, considered neither as part of the first press part 3 nor as part of the second press part 4.

In the present case, the frame 60 is composed of a plurality of tubular hollow bodies which can be implemented, for example, as extruded profiles in such a manner that the frame 60 (annularly) surrounds the respective solar module 2 placed on the bearing surface 29 and the heater 50 along a closed curve.

The frame 60 has a groove 60.3 which extends on a side of the frame 60 facing the cavity 37 along a closed curve surrounding the heater 50. In the present example, the groove 60.3 runs over its entire length substantially parallel to the bearing surface 29 and is bounded laterally by two side walls which are also directed substantially parallel to the bearing surface 29 and each form a flank of the groove 60.3 (FIGS. 7 and 8).

A sealing body 61 is inserted in the groove 60.3, extending over the entire length of the groove 60.3.

The sealing body 61 comprises a flexible hose 61.1 which in the present example forms an annular closed structure surrounding the heater 50.

The hose 61.1 is inflatable so that the volume V of the hose 61.1 can be varied by varying a gas pressure P prevailing in an interior of the hose 61.1. In order to allow the gas pressure P to be varied, the interior of the hose 61.1 is connected to a venting and ventilation channel 65 (hereinafter "channel 65") via which a gas can be supplied or removed. For this purpose, the channel 65 can be connected, for example, by conventional means (not shown in FIGS. 7 and 8), e.g. to a pump or a compressed-air reservoir, and an inflow or outflow of gas can be controlled by means of a suitable control device.

The extension of the hose 61.1 and therefore of the sealing body 61 parallel to the bearing surface 29 and therefore relative to the heater 50 can be varied by varying the gas pressure P. The groove 60.3 and the hose 61.1 are formed in such a manner that in the event of an increase in the gas pressure P, the hose 61.1 can expand substantially only parallel to the bearing surface 29 in the direction of the heater 50.

The gas pressure P in the hose or the volume V of the hose 61.1 can be varied in such a manner that at a first predetermined volume, the sealing body 61 is not in contact with the heater 50 and at a second predetermined volume, said body is in contact with the heater 50. Reference is made to FIGS. 7 and 8 for an explanation of these facts.

FIG. 8 shows the hose 61.1 in a base position (P=P1, V=V1): the extension of the hose 61.1 parallel to the bearing surface 29 is so small that an intermediate space (gap) is formed between the sealing body 61 and the heater 50 and the heater 50 can be moved in the vertical direction without coming in contact with the sealing body 61.

In the situation shown in FIG. 7, the gas pressure P and therefore the volume V of the hose 6.1 is increased (P=P2>P1, V=V2>V1): compared to the situation according to FIG. 8, the hose 61.1 is expanded so that its extension parallel to the bearing surface 29 is enlarged in such a manner that the sealing body 61 is brought into contact with the heater and fills or closes the intermediate space between the frame 60 and the heater 50.

The latter is at least the case according to FIG. 7 when the heater 50 is placed in a predetermined region in the vicinity of the solar module 2, for example, if the heater 50 is arranged so that the body 19 contacts the solar module 2: as shown in FIG. 7, the sealing body 61 is now brought into contact, on one side, with the side surface 51.2 of the plate 51 of the heater 50 and, on the side opposite the side surface 51.2, with the frame 61 in the region of the groove 60.3. The gas pressure P2 is selected in this case so that the sealing body 61 abuts in an airtight manner against the frame 60 or is embedded in the groove 60.3 in an airtight manner.

Accordingly, in the situation shown in FIG. 7, the sealing body 61 is disposed in an intermediate space between the heater 50 and the first press part 3 in such a manner and is brought or can be brought into contact with the heater 50 and the first press part 3 in such a manner that the cavity 37 is divided into two chambers 37a, 37b by the heater 50 and the sealing body 61, the two chambers 37a and 37b being separated from one another in an airtight manner. In the present case, the chamber 37b comprises the bearing surface 29 and thus serves to receive the respective solar module 2.

As indicated in FIG. 7, the respective gas pressure (Pa) in the chamber 37a can be varied by means of an inflow or outflow of gas via the venting and ventilation channel 8 in the first press part 3 whilst the respective gas pressure (Pb) in the chamber 37b can be varied by means of an inflow or outflow of gas via the venting and ventilation channels 34 in the second press part 4. In the present case, the venting and ventilation channels 34 and 8 are separate from one another. If, by means of a suitable choice of the gas pressure P in the hose 61.1, the sealing element 61 is brought into a state in which it separates the chambers 37a and 37b from one another in an airtight manner, it is accordingly possible to vary the gas pressures Pa or Pb in the chambers 37a or 37b independently of one another. For example, a vacuum or an excess pressure can be produced in the chambers 37a and 37b, independently of one another.

In order to advantageously configure the sealing body 61 and furthermore to develop advantageous possible applications of the laminating press 1 according to FIGS. 7 and 8, a number of measures are possible.

As FIGS. 7 and 8 show, a part of the surface of the sealing element 61 can be configured as a sealing strip 61.2 which is disposed on the side of the hose 61.1 facing the heater 50 and is connected to the hose 61.1. This sealing strip 61.2 can preferably be configured to be continuous over the entire length of the hose 61.1. Regardless of the gas pressure P in the hose 61.1, the surface of the sealing strip 61.2 facing the heater 50 is in each case configured to be parallel to the side surface 51.2 of the heater 50 and has an extension parallel to the side surface 51.2 of the heater 50 which is (almost) independent of the gas pressure P in the hose 61.1. This has the advantage that the sealing means 61, when brought into contact with the side surface 51.2 of the heater 50 on inflating the hose 61.1, can in each case simultaneously be brought into contact with a defined relatively large section of the side surface 51.2. This measure makes it possible to increase the sealing effect of the sealing body 61 during contact with the side surface 51.2 and simplifies controlling the gas pressure P in order to be able to ensure that the sealing body 61 reliably separates the chambers 37a and 37b from one another in a gastight manner.

As FIGS. 7 and 8 further show, the hose 61.1 is configured so that at a low gas pressure P (e.g. P=P1 according to FIG. 8) its hose wall forms one or more folds running substantially parallel to the side surface 51.2 inside the groove 60.3. This measure has the result that the hose 61.1 can expand by a relatively large distance in the direction of the side surface 51.2 with a relatively small change in the gas pressure P. The aforesaid measures accordingly make it possible to produce an open connection for a gas flow between the chambers 37a and 37b or to separate the chambers 37a and 37b from one another in a gastight manner by means of a relatively small change in the gas pressure P. In this way, it is possible to vary the respective sealing effect of the sealing body 61 and to precisely and rapidly control any change in the sealing effect of the sealing body 61.

As is further apparent in particular from FIG. 8, the extension D of the side surface 51.2 of the plate 51 of the heater 50 in the direction of a vertical relative to the bearing surface 29 is greater than the width of the groove 60.3 or the width of the sealing strip 61.2 (in each case measured in the direction of a vertical relative to the bearing surface 29). These constructive measures afford many advantages. Since the extension D is greater than the width of the groove 60.3 or the width of the sealing strip 61.2, the distance of the heater 10 in relation to the bearing surface 29 can be varied over a relatively large range, in which case the sealing body 61 can be brought into contact with the side surface 51.2 by increasing the gas pressure P from P=P1 (FIG. 8) to P=P2 (FIG. 7) in order to separate the chambers 37a and 37b from one another in a gastight manner. Since the sealing body 61 can be separated from the side surface 51.2 (e.g. by lowering the gas pressure P to P=P1), the distance of the heater 50 relative to the bearing surface 29 can be varied without mechanically loading the sealing body 61. Since the expansion of the hose 61.1 takes place substantially perpendicular to the side surface 51.2, the sealing effect of the sealing body 61.2 is substantially independent of the distance of the heater 50 relative to the bearing surface 29.

The aforesaid properties of the sealing body 61 thus make it possible to vary the extension of the chambers 37a and 37b perpendicular to the bearing surface 29 simply and rapidly within predefined limits and to separate the two chambers 37a and 37 in each case with the aid of the same sealing body 61 in a gastight manner without needing to mechanically load the sealing body 61 during said variation of the chambers 37a and 37b and without needing to replace the respective sealing body 61 by another sealing body.

For the aforesaid reasons the laminating press 1 shown in FIGS. 7 and 8 is particularly well suited for processing solar modules 2 of different thickness. Depending on the range in which the thicknesses of the solar modules 2 to be processed vary, it is sufficient to select the extension D of the side surface 51.2 to be sufficiently large.

During operation, the laminating press 1 according to FIGS. 7 and 8 can be used as follows. Starting from the situation according to FIG. 8 in which a solar module 2 is already placed on the bearing surface 29 and the press parts 3 and 4 have been brought into a position in which the laminating press 1 is closed, the heater 50 is initially located at a distance from the solar module 2. Furthermore, the volume V of the hose 61.1 is adjusted in such a manner that the sealing element 61 is not in contact with the heater 50 so that the two chambers 37a and 37b of the cavity 37 are not separated in an airtight manner (e.g. P=P1, V=V1). The heater 50 is then moved towards the solar module until the heater 50 (or the body 19) contacts the solar module 2. The hose 61.1 is then expanded until the sealing body 61 is brought into contact with the side wall 51.2 so that the two chambers 37a and 37b are separated from one another in an airtight manner (e.g. P=P2, V=V2 according to FIG. 7). The process steps described in connection with FIGS. 1-6 can then be carried out.

The invention claimed is:

1. An apparatus for laminating a solar module, comprising a press for pressing and heating the respective solar module which press comprises:
   a) a first press part and a second press part which press parts are movable relative to one another and can be brought into a predetermined position in which a cavity is formed between the first and the second press part, which cavity can be evacuated,
   b) a bearing surface for the respective solar module disposed in the cavity,
   c) a heater which is disposed in the cavity and which is movable relative to the first press part and to the second press part and to the bearing surface in such a manner that the respective solar module can be pressed by means of the heater with respect to the bearing surface,
   wherein the press comprises a sealing body, the sealing body being disposed in an intermediate space between the heater and the first press part or in an intermediate space between the heater and the second press part and the sealing body forming a closed ring extending along a closed curve surrounding the heater,
   wherein the sealing body comprises a flexible hose, said hose having a volume that can be varied—by varying a pressure prevailing in the hose—in such a manner that, at a first predetermined volume, the sealing body is not in contact with the heater or at least one of the first press part and the second press part, and, at a second predetermined volume, the sealing body is brought into contact with the heater and at least one of the first press part and the second press part in such a manner that the cavity is divided by the heater and the sealing body into at least two chambers which are separated from one another in an airtight manner, wherein one of the chambers comprises the bearing surface.

2. The apparatus according to claim 1, wherein one of the chambers is formed between the first press part, the sealing body and the heater and another of the chambers is formed between the second press part, the sealing body and the heater.

3. The apparatus according to claim 1, wherein the hose is inflatable and the apparatus has means for varying a gas pressure prevailing in the hose.

4. The apparatus according to claim 1, wherein the first press part comprises a cover which delimits the cavity and a sealing apparatus which sealing apparatus comprises:
   a frame surrounding the first solar module having a first contact surface for the cover and having a second contact surface for the second press part,
   a seal disposed on the first contact surface between the cover and the frame and
   a seal disposed on the second contact surface between the frame and the second press part.

5. The apparatus according to claim 4, comprising fastening means for fastening the frame on the cover.

6. The apparatus according to claim 4, wherein the sealing body abuts in an airtight manner against the frame or is embedded in an airtight manner in a groove formed in the frame.

7. The apparatus according to claim 1, comprising means for varying a gas pressure prevailing in one of the chambers and comprising means for varying a gas pressure prevailing in another one of the chambers, wherein the gas pressures prevailing in the respective chambers can be varied independently of one another.

8. The apparatus according to claim 7, wherein a vacuum or an excess pressure can be generated in the respective chamber.

9. The apparatus according to claim 1, wherein the heater is movably fastened to one of the press parts, with means for moving the heater perpendicularly to the bearing surface.

10. The apparatus according to claim 1, wherein the heater comprises: a plate and at least one first heating element for heating the plate, wherein the respective heating element is disposed on a side of the plate facing away from the bearing surface.

11. The apparatus according to claim 10, wherein an elastically deformable body is disposed on the plate on a side facing the bearing surface in such a manner that on pressing the solar module the respective solar module is separated from the plate by means of this elastically deformable body, wherein the elastically deformable body has a stiffness which is less than the stiffness of the plate.

12. The apparatus according to claim 11, wherein the elastically deformable body is configured as a mat formed from an elastic material or as a cushion filled with a liquid.

13. The apparatus according to claim 11, comprising a protective film which is disposed between the elastically deformable body and the respective solar module.

14. The apparatus according to claim 10, wherein the first heating element has a plurality of heating means which are disposed in a spatially distributed manner on the side of the plate facing away from the bearing surface.

15. The apparatus according to claim 10, wherein the first heating element comprises: one or more tubes, wherein the respective tubes are filled or can be filled with a heating fluid; and/or one or more electrical resistance heating elements; and/or one or more inductive heating elements; and/or one or more radiation sources; and/or one or more means for introducing hot air.

16. The apparatus according to claim 1, wherein one of the press parts comprises a bearing plate for the respective solar module, the bearing surface for the respective solar module is formed on one side of the bearing plate and the apparatus comprises at least a second heating element for heating the bearing plate.

17. The apparatus according to claim 1, comprising one or more spacers for limiting a distance between the heater and the bearing surface, wherein the respective spacer is disposed in such a manner that the respective spacer blocks a movement of the heater directed to the bearing surface when the distance between the heater and the bearing surface reaches a predetermined value.

18. The apparatus according to claim 1, wherein the hose forms an annular closed structure surrounding the heater.

19. The apparatus according to claim 1, comprising means for varying the pressure prevailing in the hose.

20. The apparatus according to claim 1, wherein the at least one sealing element comprises a sealing strip that is disposed on a side of the hose facing the heater and that is connected to the hose, said sealing strip being brought into contact with a side surface of the heater, if the volume of the hose is equal to the second predetermined volume.

* * * * *